United States Patent [19]

Keenan

[11] 4,402,534
[45] Sep. 6, 1983

[54] AIR HOSE COUPLING LOCK
[75] Inventor: John R. Keenan, Watertown, N.Y.
[73] Assignee: General Signal Corporation, Stamford, Conn.
[21] Appl. No.: 267,522
[22] Filed: May 27, 1981
[51] Int. Cl.³ .................. F16L 55/00; F16L 35/00
[52] U.S. Cl. .................................. 285/69; 285/82
[58] Field of Search ............... 285/69, 72, 76, 79, 285/82

[56] References Cited
U.S. PATENT DOCUMENTS

| | | | |
|---|---|---|---|
| 1,619,464 | 3/1927 | Eichhorn | 285/69 |
| 3,892,431 | 7/1975 | Booth | 285/79 |
| 3,941,254 | 3/1976 | Sweger | 285/69 X |
| 4,125,279 | 11/1978 | Scott | 285/69 |
| 4,129,323 | 12/1978 | Wilson | 285/69 |

Primary Examiner—Richard J. Scanlan, Jr.
Attorney, Agent, or Firm—Leitner, Palan, Martin & Bernstein

[57] ABSTRACT

A lock having a first portion for engaging a first coupling and in concert with a shoulder of a second portion to lie in the plane of the lip of a second coupling inhibits uncoupling rotation. A third portion of the lock for engaging the first coupling maintains the shoulder in the plane and the lock is further maintained in position by a fourth portion engaging both couplings. The first and third portions are in substantially the same plane for ease of insertion of the lock.

16 Claims, 8 Drawing Figures

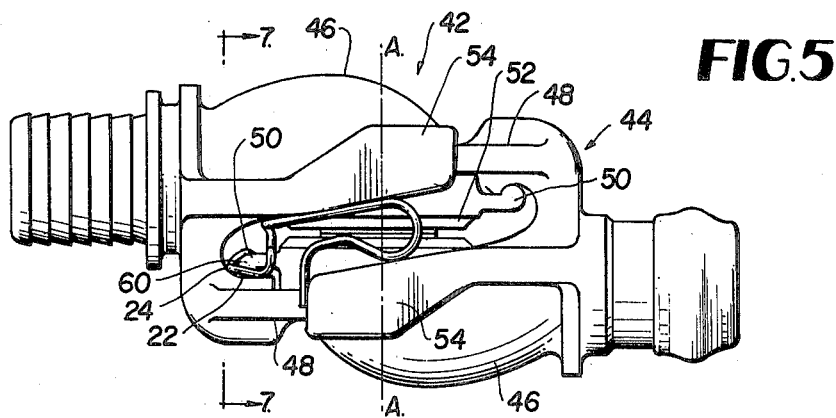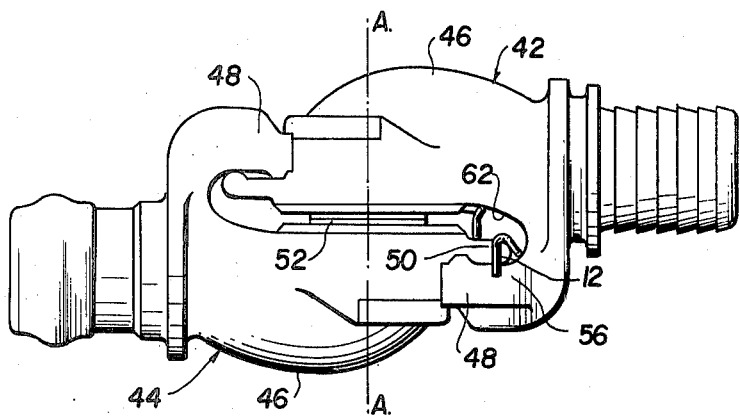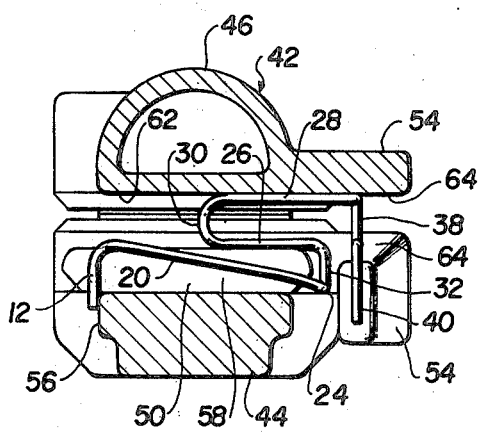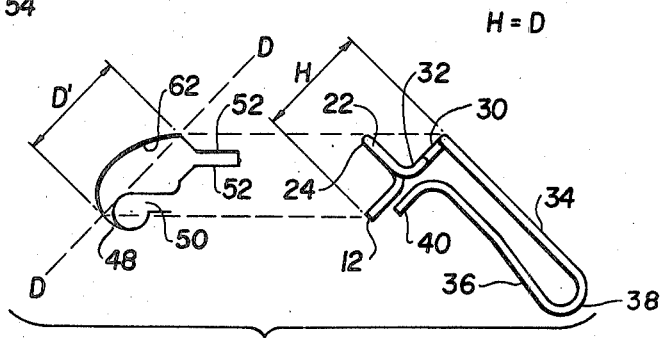

AIR HOSE COUPLING LOCK

BACKGROUND OF THE INVENTION

The present invention relates generally to the air brakes used for railroad cars. It particularly relates to the flexible hose assemblies between adjacent cars in a train that provide an integral air connection throughout the length of the train. This is referred to by railroad persons as the "brake pipe." This "brake pipe" carries air that is pumped through the length of the train by a compressor in the locomotive. The fail safe feature of the air brake system is provided by filling the air storage vessels located on each car in the train to a predetermined pressure level. The brake control valve on each car will self-adjust into a brake release mode when the pressure of air in the air storage vessel on each car and in the control valve is at equilibrium with the pressure in the brake line. The train may then be propelled along the track by the locomotive as long as the air pressure in the brake pipe is within a small difference in pressure with the pressure in the air storage vessel on the individual cars of the train. The brakes can be applied by the engineer lowering the air pressure in the brake pipe in fixed proportion to the braking force desired. An emergency brake application can be created, when desired, by rapidly reducing the air pressure in the brake pipe.

A fail safe emergency brake application will be automatically created if the integrity of the brake pipe is broken. The unintentional disconnection or uncoupling of two hose assemblies between adjacent cars will result in rapid loss of air pressure in the brake line. This in turn causes all the brakes on the cars of the train to apply with maximum force.

Individual hose couplings are designed to facilitate rapid manual assembly and disassembly. The coupling together of two adjacent hose assemblies is achieved by manually raising and rotating the coupling ends of the two hoses so that the guard arm and lip of one coupling can be moved into the same plane as the lip and guard arm of the adjacent coupling. The hose coupling ends are then rotated downward so that the lip bead of each coupling will enter the groove of the guard arm on the mating coupling. Rotation of the two couplings will continue until the guard arm of each coupling contacts the stop lug of the mating coupling. The guard arms and lips of mating couplings are provided with ramps that cause the couplings to exert a compressive force on the coupling gaskets in the mating faces of the couplings. The compressed gaskets will prevent leakage of air from the coupled air hose assemblies. Gravity and the forces induced by the bent condition of the two hose assemblies will normally retain the couplings in the interlocking mode.

A counter-rotating motion created by manually raising the hose assemblies will allow the couplings to be disconnected. A similar counter-rotation motion can be induced by the vertical movement of the hose assemblies resulting from the oscillations and lurching of the car bodies during train operations. At such occasions of unintentional hose separation, the brakes are simultaneously applied at full force and the train quickly decelerated to a stop. An emergency application of brakes during a high speed train operation may result in the wearing of flat spots on the wheels, and damage to lading or injury to livestock or passengers.

In an effort to address this problem, the industry has provided hose couplings with unitary mechanisms to prevent the uncoupling of a pair of air hose couplings. Specially designed air hose couplings having an integral latch are illustrated in U.S. Pat. Nos. 3,892,431; 4,129,323; and 4,125,279. Although such prior art devices provide a latch or other device to prevent undesirable uncoupling, they do require specially designed air hose couplings. This is uneconomical. Similarly, such devices provide no solution to the undesirable uncoupling of air hose couplings which are presently in use.

Prior art devices are available which are attachable to preexisting air hose couplings and to serve as latching means for preventing uncoupling thereof. A typical example is U.S. Pat. No. 3,941,254. The locking means is a wire form which can be secured to the air hose coupling and form an integral part thereof. The locking means provides a shoulder parallel to the axis of rotation of the coupling to engage the side of a lip and coact with another portion which engages the housing of the other air coupling to provide a lock. Although providing a device which may be used with preexisting air hose couplings, the particular configuration of U.S. Pat. No. 3,941,254 is subject to misalignment during the motion of the train and consequently cannot ensure that the locking shoulder is always in place. Also the locking wire form is not readily positioned on the coupled air hose couplings.

SUMMARY OF THE INVENTION

An object of the present invention is to provide a lock for inhibiting uncoupling rotation of air hose couplings which is readily used with pre-existing air hose couplings.

Another object of the present invention is to provide a lock for inhibiting uncoupling rotation of air hose couplings which is inexpensive and easy to use.

Another object of the present invention is to provide a lock for inhibiting uncoupling rotation of air hose couplings which will be maintained in position during the normal use of the train.

Still a further object of the present invention is to provide a lock for an air hose coupling which is readily detached so as not to interfere with the manual uncoupling of the air hoses.

These and other objects of the invention are attained by a lock formed from a resilient wire having a first portion for engaging the body of a first coupling, a second portion extending from the first portion and having a shoulder for engaging the side of a lip of a second coupling to inhibit the unlocking rotation of the two couplings in concert with the first portion and a third portion extending from said second portion for inhibiting movement of the shoulder. The shoulder of the second portion lies in a plane traverse to the axis of uncoupling rotation and the third portion extends substantially parallel to the axis of rotation to maintain the shoulder within its plane. A fourth portion extending from the third portion engages the bodies of the two couplings to maintain the lock in place. The lock is inserted at an angle along the diagonal between the body of the first coupling adjacent the coupling port and the portion of the arm exposed with the lip of the other coupling latch thereon. The lock is then rotated to align the portions with the fourth portion locking the total lock in place between the two bodies. The first portion and third portions lie substantially in a plane to facilitate insertion through the coupled air hose couplings.

Other objects, advantages and novel features of the present invention will become apparent from the following detailed description of the invention when considered in conjunction with the accompanying drawings.

BRIEF DESCRIPTION OF THE DRAWINGS

FIG. 5 is side view of a pair of air hose couplings with a lock incorporating the principles of the present invention in place to inhibit uncoupling rotation.

FIG. 6 is a side view of the opposite side of FIG. 5.

FIG. 7 is a cross-sectional view taken along lines 7—7 of FIG. 5.

FIG. 8 is a perspective view illustrating the method of installing the lock of the present invention to a pair of coupled air hose couplings.

DESCRIPTION OF THE PREFERRED EMBODIMENTS

Figure 1:
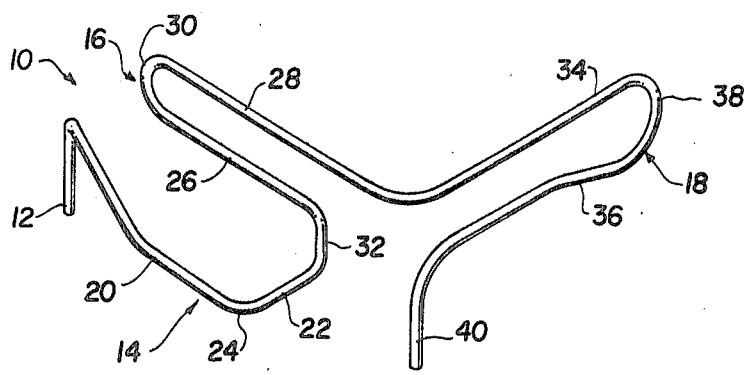
FIG. 1 is a perspective view of a lock incorporating the principles of the present invention.

As illustrated in FIGS. 1 through 4, a lock 10 according to the present invention is formed from a single piece of resilient wire and includes a first portion 12, second portion 14, third portion 16, and fourth portion 18. The second portion 14 includes a pair of arms 20 and 22 at substantially right angles to each other having a corner 24 to thereby form a shoulder. The third portion 16 is generally U-shaped having legs 26 and 28 and a bight 30. A segment 32 interconnects leg 26 of the third portion 16 to arm 22 of the second portion 14. The fourth portion 18 is also generally U-shaped having legs 34 and 36 and bight 38. The leg 34 of the fourth portion is connected to leg 28 of the third portion. A segment 40 extends from the end of leg 36 of the fourth portion 18.

Figure 2:
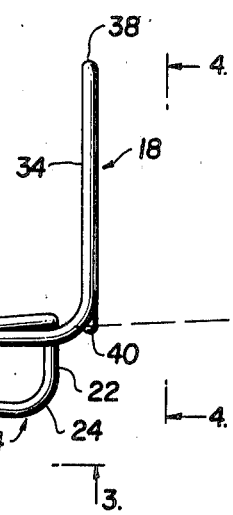
FIG. 2 is a plan view of the lock of FIG. 1.
Figure 3:
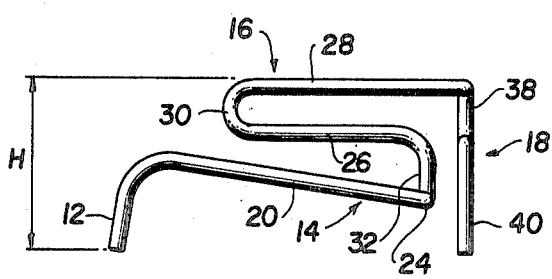
FIG. 3 is a side view taken along lines 3—3 of FIG. 2.
Figure 4:
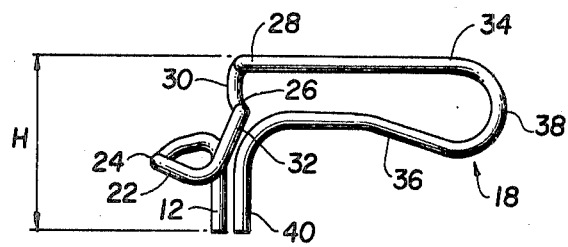
FIG. 4 is a side view taken along lines 4—4 of FIG. 2.

As illustrated in FIG. 2, the first portion 12 is aligned so as to lie in the plane of the second U-shaped portion 16. The edge of the plane is illustrated by the dotted line PP. The sum of the lengths of the first portion 12 and segments 32 and 30 of the third portion 16 is defined as H and is illustrated in FIGS. 3 and 4. The fourth portion 18 extends traverse to the third portion 16 and is substantially parallel to arm 22 of the second portion. The importance of the first portion 12 lying in the plane of the third portion 16, the sum of the lengths defined as H and the position of the fourth portion relative to the third portion will become evident in discussion of the attachment of the lock to a pair of coupled air hose couplings. Similarly the specific design and lengths of the different portions 12, 14, 16 and 18 will also be described relative to their specific engagement with portions of a pair of coupled air hose couplings.

As illustrated in FIGS. 5 through 7, a pair of air hose couplings 42 and 44 are shown coupled together. Each of the air hose couplings includes a body 46 having a guard arm 48 extending from one portion thereof and a lip 50 extending from another portion thereof adjacent the air port 52. A stop 54 provided on each body 46 to receive the guard arm of the other coupling to limit the rotational movement in one direction beyond a predetermined point. The lip of one coupling is received on the guard arm of the other coupling to provide a guide and locking surface for the pivotal motion once the air ports 50 are aligned about an axis A as illustrated in FIGS. 5 and 6. The coupling directional rotation is out of the plane of the paper illustrated in FIG. 5 and the uncoupling motion is into the plane of the paper illustrated in FIG. 5 about the axis A.

With the lock 10 of the present invention in place, the first portion 12 engages the outer surface 56 of the housing 46 or guard arm 48 of coupling 42. Arm 20 of the second portion 14 extends along the face 58 of lip 50 of coupling 44 and the arm 22 of the second portion 14 lying in the path of side edge 60 of the lip 50. Corner 24 and arm 22 of the second portion lie in the plane of the lip 50. The legs 26 and 28 of the third portion extend along the top surface of lip 50 of coupling 44 and the interior surface 62 of the body 46 or coupling 42, respectively, with the top leg 28 engaging interior surface 62. Legs 34 and 36 of the fourth portion extend along and engage opposing surfaces 64 of the stops 54 of the couplings 42 and 44, respectively.

The first portion 12 which engages the first air coupling 42 and acts in concert with arm 22 of the second portion 14 to inhibit uncoupling rotation of the air coupling when the arm 22 engages the side 60 of lip 50 of the second air coupling 44. Segments 32 and 30 of the third portion are substantially parallel to the axis A of uncoupling rotation and in concert with leg 28 which engages surface 62 of the first air coupling 42 and maintains the leading edge of arm 22 in the plane and path of the lip 50 of the second air coupling. The fourth portion 18 by extending traverse to the plane of the remaining portions of the lock also prevents pivotal rotation of the lock and specifically prevents rotation of the corner 24 of the shoulder out of the plane of the lip 50. Legs 26 and 28 of the third portion and legs 36 and 34 of the fourth portion are as long as possible to increase the contact area and the stability and alignment of the lock on the coupled air hose couplings. Similarly, the length of the legs of the fourth portion 18 increases the leverage and consequently reduces the effort needed to insert and lock the lock 10 in place.

It should be noted that by maintaining the second portion 14 in the plane of the lip 50 such that the lip engages leg 22 of the second portion, the uncoupling forces of the lip on the lock do not produce displacement of misalignment of the total lock. The third portion 16 prevents displacement of the shoulder along the axis or rotation and in combination with the fourth portion prevents any rotational movement of the shoulder out of the plane of the lip.

Another unique feature of the present lock is the method in which it is inserted and attached to a pair of coupled air hose couplings. As illustrated in FIG. 8, the distance along a line or diagonal DD drawn between the portion of interior surface 62 adjacent the air port 52 and the exposed portion of guard arm 48 with the lip 50 latched thereto is signified by the letter D. The length H of the lock 10 as previously described as including the length 12 of the first portion and of segments 30 and 32 of the third portion 16 are substantially equal.

Since the first portion 12 and segments 30 and 32 lie in substantially the same plane, the lock 10 is positioned such that the first portion 12 and segments 30 and 32 lie along the diagonal D and inserted through the opening. As the fourth portion 18 engages the outer surface of lock 54, the first portion 12 has extended through the opening. The fourth portion 18 is then rotated in a direction which would be counterclockwise in FIG. 5 positioning the fourth portion between the opposed surfaces 64 of the stops 52. This rotation positions the first portion 12 extending down out of the opening to engage the outer surface 56 of the housing 46 and guard arm 48. The shoulder of the second portion 14 is aligned within the plane of the lip 50 and held in place by the third portion 16 and the fourth portion 18.

The lock is readily removed by grasping the fourth portion 18, removing it from the area between the stops 54 and rotating it clockwise. Thus, it can be seen that the interrelationship of the portions of the lock 10 provide not only alignment and locking of a pair of coupled air hose couplings against uncoupling rotation, but are so designed to be readily inserted and removed.

From the preceding description of the preferred embodiment, it is evident that the objects of the invention are attained and although the invention has been described and illustrated in detail, it is to be clearly understood that the same is by way of illustration and example only and is not to be taken by way of limitation. Although only one lock is shown, a second lock may be used for the other lip and guard arm, but it is not needed. If desired, the lock may be attached to a coupling by a tether to prevent loss when the couplings are disconnected. The spirit and scope of this invention are to be limited only by the terms of the appended claims.

What is claimed is:

1. A lock for inhibiting uncoupling rotation of a first and a second coupled air hose couplings, each air hose coupling having a lip and a guard arm extending from a body and latchable to the guard arm and lip, respectively, of the other air hose coupling, said lock being a resilient wire form comprising:
    a first portion for engaging the exterior surface of the body of a first coupling on one side of the lip of said second coupling;
    a second portion extending from said first portion and having a shoulder for engaging an opposing side of said lip of said second coupling from the side of said lip engaged by said first portion and for inhibiting unlocking rotation of said first and second couplings in concert with said first portion; and
    a third portion extending from said second portion and having at least one segment to be parallel to the axis of uncoupling rotation for engaging the body of said first coupling and for inhibiting movement of said shoulder parallel to the axis of uncoupling rotation.

2. The lock according to claim 1 wherein said shoulder is to be in a plane traverse to the axis of uncoupling rotation.

3. The lock according to claim 1 including a fourth portion extending from said third portion, and including leg means and at least one segment to be parallel to the axis of uncoupling rotation for engaging and supporting said leg means, and said leg means engaging the body of said second coupling and for preventing rotation of said lock.

4. A lock for inhibiting uncoupling rotation of a first and a second coupled air hose couplings, each air hose coupling having a lip and a guard arm extending from a body and latchable to the guard arm and lip, respectively, of the other air hose coupling, said lock being a resilient wire form comprising:
    a first portion for engaging the exterior surface of the body of a first coupling on one side of the lip of a second coupling;
    a second portion extending from said first portion to be in a plane of a lip of said second coupling transverse to the axis of uncoupling rotation and having a shoulder for engaging an opposing surface of said lip of said second coupling from the side engaged by said first portion in said plane and for inhibiting unlocking rotation of said first and second couplings in concert with said first portion; and from said side engaged by said first portion in a plane and for inhibiting an unlocking rotation of said first and second coupling in concert with said first portion; and
    a third portion extending from said second portion for engaging the body of said first coupling and for preventing rotation of said shoulder out of said plane.

5. A lock for inhibiting uncoupling rotation of a first and a second coupled air hose couplings, each air hose coupling having a lip and a guard arm extending from a body and latchable to the guard arm and lip, respectively, of the other air hose coupling, said lock being a resilient wire form comprising:
    a first portion for engaging the body of a first coupling;
    a second portion extending from said first portion and having a shoulder in a plane traverse to the axis of uncoupling rotation for engaging one side of the lip of a second coupling and for inhibiting unlocking rotation of said first and second couplings in concert with said first portion;
    a third portion extending from said second portion and having at least one segment to be parallel to the axis of uncoupling rotation for engaging the body of said first coupling and for inhibiting movement of said shoulder parallel to the axis of uncoupling rotation; and
    a fourth portion extending from said third portion and being substantially parallel to that length of said shoulder which is to engage said lip, said fourth portion including leg means and a segment parallel to said axis of uncoupling rotation which supports said leg means and engages the spaced opposed surfaces of the bodies of said first and second couplings to prevent rotation of said shoulder out of said plane.

6. The lock according to claim 5 wherein said third portion is generally U-shaped, the legs of the U are to extend along spaced opposed surfaces of said body of said first coupling and said lip of said second coupling, one of said legs is to engage said body surface of said first coupling and the bight of the U is to be parallel to said axis of uncoupling rotation.

7. The lock according to claim 6 wherein said first portion is to be parallel to said axis of uncoupling rotation.

8. The lock according to claim 7 wherein said first portion is substantially in the plane of said third portion.

9. The lock according to claim 6 including a fourth portion extending from and traverse to said third portion, said fourth portion includes leg means and at least one segment which supports said leg means and is parallel to said axis of uncoupling rotation and engages spaced opposed surfaces of the bodies of said first and second couplings to prevent rotation of said third portion.

10. The lock according to claim 5 wherein said fourth portion is generally U-shaped, the legs of the U are to extend along spaced opposed surfaces of said bodies of said first and second coupling and the bight of the U is to be parallel to said axis of uncoupling rotation.

11. The lock according to claim 5 wherein said first portion is to be parallel to said axis of uncoupling rotation, the sum of the length of said first portion and said segment of said third portion is substantially equal to a diagonal between the body of said first coupling adjacent the coupling port of said first coupling and the portion of the guard arm of said first coupling exposed with the lip of said second coupling latched thereon so that said first, second and third portions may be inserted through the space between said body and guard arm at an angle along said diagonal and subsequently rotated and locked in placed by said fourth portion.

12. A lock for inhibiting uncoupling rotation of a first and a second coupled air hose couplings, each air hose coupling having a lip and a guard arm extending from a body and latchable to the guard arm and lip, respectively, of the other air hose coupling, said lock being a resilient wire form comprising:

a first portion for engaging the body of a first coupling;

a second portion extending from said first portion to be in a plane of a lip of said second coupling transverse to the axis of uncoupling rotation and having a shoulder for engaging one side of said lip of said second coupling in said plane and for inhibiting unlocking rotation of said first and second couplings in concert with said first portion; and a third portion extending from said second portion for engaging the body of said first coupling and for preventing rotation of said shoulder out of said plane, said third portion being generally U-shaped, the legs of the U extending along spaced opposed surfaces of said body of said first coupling and said lip of said second coupling, one of said legs engaging said body surface of said first coupling, and the bite of the U being parallel to said axis of uncoupling rotation.

13. The lock according to claim 12 wherein said first portion is substantially in the plane of said third portion.

14. The lock according to claim 12 including a fourth portion extending from said third portion for engaging the body of said second coupling and for preventing rotation of the corner of said shoulder out of said plane, said third portion preventing rotation of the leading edge of said shoulder out of said plane.

15. A method of assembling a locking means having a first portion, a second portion including a shoulder, a third portion and a fourth portion to a pair of coupled air hose couplings having a lip and guard arm extending from a body and latched to the guard arm and lip, respectively, of the other air hose couplings comprising:

positioning said first and third portions of said lock along a diagonal between the body of said coupling adjacent the coupling port and the portion of the guard arm exposed with the lip of the other coupling latched thereon;

inserting said first, second and third portions through the space between said couplings along said diagonal until said first portion extends beyond the couplings; and rotating said fourth portion and locking it between opposing surfaces of the pair of couplings to position and lock said shoulder in place in the plane of the lip.

16. The method according to claim 15 wherein said rotating step positions said third portion to extend between the top of the lip and the lower surface of the opposed body and to thereby prevent movement of the shoulder out of the plane of the lip.

* * * * *